H. LANDSIEDEL.
ADDING MACHINE.
APPLICATION FILED AUG. 6, 1913.

1,270,845.

Patented July 2, 1918.
3 SHEETS—SHEET 1.

WITNESSES

INVENTOR
Harry Landsiedel,
BY
ATTORNEY

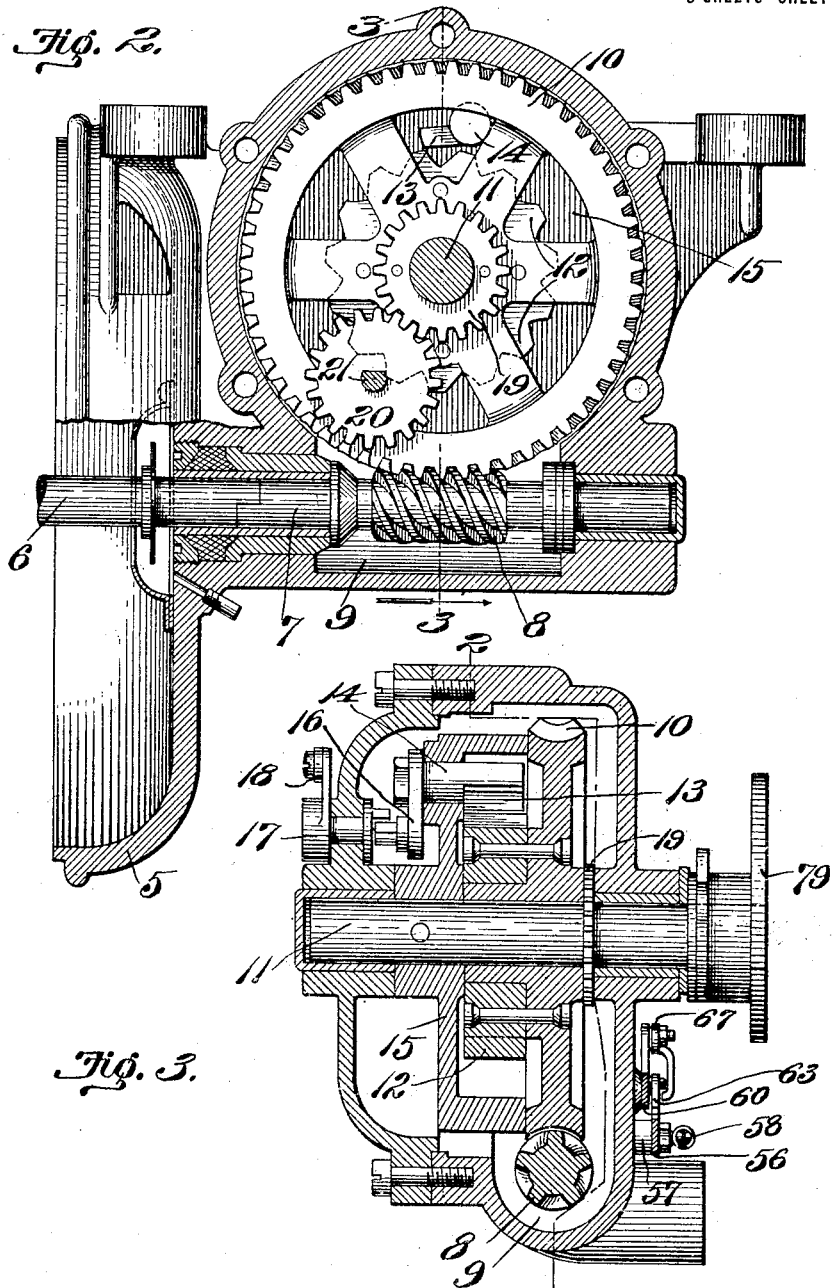

H. LANDSIEDEL.
ADDING MACHINE.
APPLICATION FILED AUG. 6, 1913.
1,270,845.
Patented July 2, 1918.
3 SHEETS—SHEET 3.
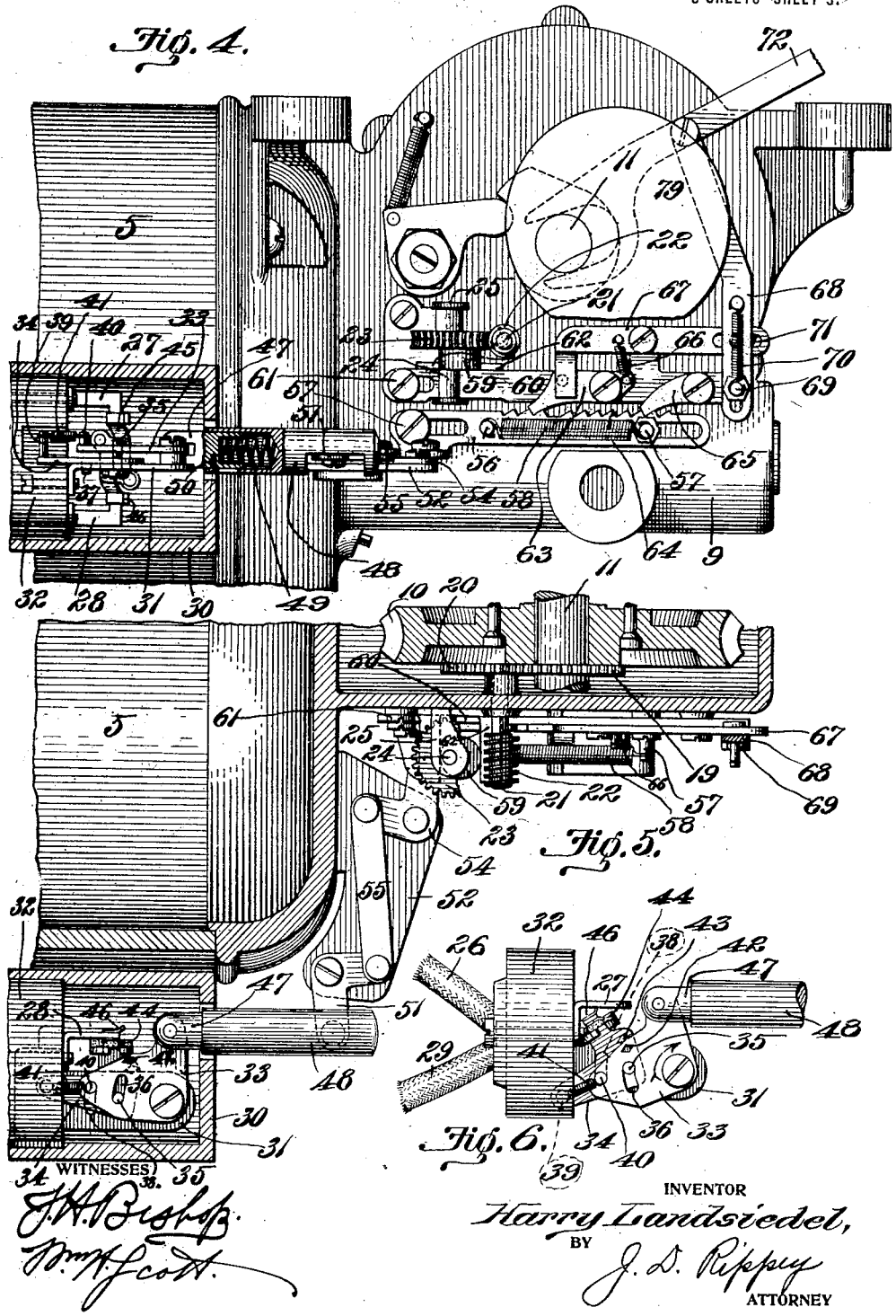
INVENTOR
Harry Landsiedel,
BY
J. D. Rippey
ATTORNEY

UNITED STATES PATENT OFFICE.

HARRY LANDSIEDEL, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

ADDING-MACHINE.

1,270,845.           Specification of Letters Patent.         Patented July 2, 1918.

Application filed August 6, 1913. Serial No. 783,299.

*To all whom it may concern:*

Be it known that I, HARRY LANDSIEDEL, a citizen of the United States, residing at Poplar Bluff, Missouri, have invented a new and useful Adding-Machine, of which the following is a specification.

This invention relates to adding machines and it consists of the combination with the main or operating shaft of the adding machine arranged to be rocked in opposite directions by different actuating mechanisms, of a shaft, means under control of the operator for maintaining said shaft in constant rotation, and novel mechanism actuated by said constantly rotating shaft effectively to cut off the driving power and thereby prevent said shaft from rotating.

An object of the invention is to provide a combination of the character mentioned including also a controlling device operable to admit and to cut off power, a constantly rotating shaft driven by the power, operating connections for operating the controlling device to turn on the power whereby said shaft will be rotated, means driven by said shaft for operating said connections effectively to cut off the power, and devices operated as an incident to the operation of the rock shaft to disable said means whereby cutting off of the power will be prevented so long as said rock shaft is operated within predetermined periods of time.

Another object is to provide a positive and accurate actuating or driving mechanism for the adding machine in combination with positively and accurately operated devices controlled by the operating mechanism for cutting off the power after a predetermined period of time, during which the adding machine remains inoperative.

Numerous specific objects will appear from the following detailed description of the embodiment of my invention illustrated in the accompanying drawings in which—

Figure is a side elevation of an adding machine, partially in section, and a motor for controlling the operation of the adding machine.

Fig. 2 is a sectional view of a part of the motor taken on the line 2—2 of Fig. 3.

Fig. 3 is a sectional view on the line 3—3 of Fig. 2.

Fig. 4 is a sectional view illustrating the power controlling mechanism and the devices operated by the power for actuating the power controlling mechanism to cut off the power.

Fig. 5 is a view partly in plan and partly in section further illustrating the power controlling mechanism.

Fig. 6 is a detailed view of a part of the power controlling mechanism.

Figure 1:
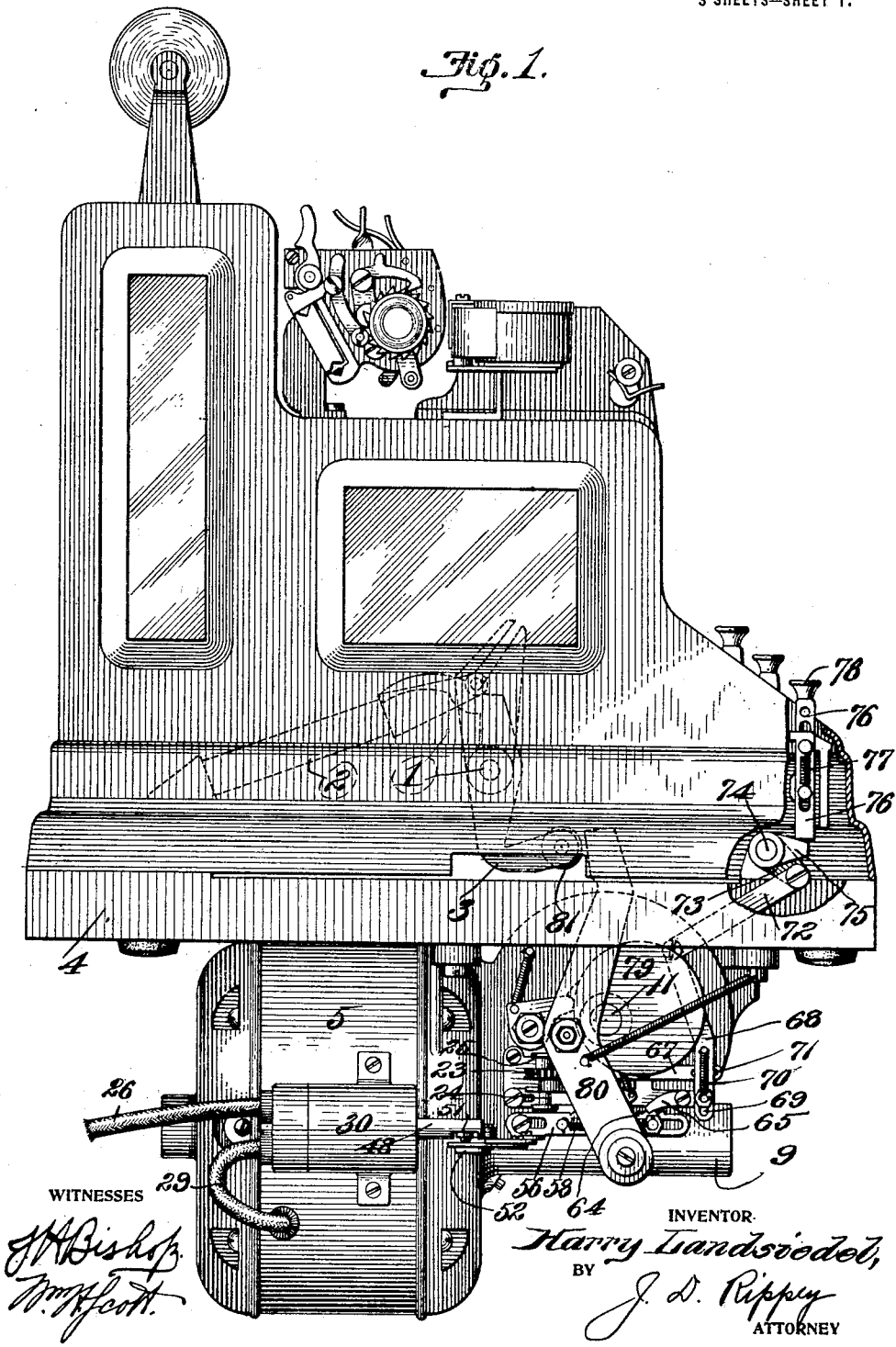

The adding machine which is illustrated in the accompanying drawings is a "Dalton" adding machine, the operating mechanism of which is controlled by a rock shaft 1 which is actuated or rocked to its idle position by springs 2 having their lower ends connected to the base of the machine and their opposite ends connected to arms on said rock shaft. The rock shaft is provided with a lever 3 by which the said shaft may be rocked in one direction in opposition to the springs 2, thereafter being restored to idle position by said springs. The adding machine is removably supported upon a supporting frame 4 which also supports a motor 5. The motor is of the electrically operated type and, when in operation, rotates a shaft 6 which is arranged to drive a shaft 7. The shaft 7 carries a worm 8 which is arranged to operate within an oil receptacle 9 and which is in mesh with a wheel 10. The wheel 10 is loosely mounted on a shaft 11 and is connected with a wheel 12 which is provided with a number of notches in its periphery. A blade 13 is supported by a stud 14 mounted in a support 15 which is attached to the shaft 11. Since the wheel 10 is constantly rotating when the motor is working, and since the support 15 is attached to the shaft 11, it is obvious that the shaft 11 will also be rotated when the blade 13 is engaged by the rotating wheel 12. The engagement of the blade 13 with the wheel 12 is controlled by an arm 16 and the connections 17 which normally engage the arm 16 to hold the blade 13 out of engagement with the wheel 12. A connection 18 is provided for manipulating the connections 17 as required to release said connections from the arm 16 and thereby enable the blade 13 to drop and to be engaged by the rotating wheel 12. The key actuated devices for operating the connections 18 and 17 to enable the blade 13 to be engaged by the rotating wheel 12 constitute no part of the present invention, the said connection being a part of the subject matter of my former application Serial Number 702,113, filed June 6, 1912, now Patent No. 1,209,858, Dec. 26, 1916. All that appears necessary for a complete understanding of the present invention is to know that release of the connections 17 from the arm 16 permits the blade 13 to engage the rotating wheel 12. Manipulation of the connections 17 may be effected in different ways, and I do not claim the manipulating devices therefor in this application.

The wheel 10 is connected with and drives a pinion 19 (Figs. 2 and 5), and said pinion 19 meshes with a pinion 20 supported upon a shaft 21 journaled in the casing which incloses the parts just described. The outer end of the shaft 21 is provided with a worm 22 which is in constant mesh with a pinion 23 (Figs. 4 and 5). The pinion 23 is rigid upon a shaft 24 journaled in bearings in a support 25, so that said pinion 23 and said shaft 24 are in constant rotation when the motor is working and when the wheel 10 is rotating.

The motor is of the electric type and receives power through a circuit 26 controlled by switch mechanism. The circuit 26 leads to a terminal 27 (Fig. 4), and thence through the switch mechanism to another terminal 28, and thence through the circuit 29 (Figs. 1 and 5), to the motor. The improved switch connection, and the mechanism for operating the same to turn the power on and off, are important features of the present invention. The switch terminals 27 and 28, and the switch mechanism for connecting and disconnecting said terminals to close and open the circuit are inclosed within a case 30. A support 31 is mounted in the case upon a block 32 of porcelain or other suitable material which also supports the switch terminals. A lever 33 of the bell crank type is pivoted to the support 31 and extends alongside of another lever 34 also pivoted to said support 31. The stud 35 upon which the lever 34 is pivotally supported extends through a slot 36 in the lever 33 and limits or restricts the scope of movement of said lever 33. Movement of the lever 33 is limited or restricted by a pin 37 thereon extending into a slot 38 in the support 31. The lever 34 extends beyond the end of the lever 33, and is provided with a projection 39 which is connected to a similar projection 40 on the lever 33 by means of a retractile spring 41. The lever 33 is provided on its side, which is adjacent to the lever 34, with a projection 42 adapted to perform a locking and camming action with a similar projection 43 on the face of the lever 34. The end of the lever 34 supports a section 44 of insulating material to which is connected a switch connection 45, the latter being insulated from the lever 34. The ends of the switch connection 45 are bifurcated as indicated at 46, so that when said connection is between the contact terminals 27 and 28 the bifurcated extremities of said connection embrace the inwardly extending ends of said terminals, as shown in Figs. 4 and 5. The switch is closed by manipulating the levers 33 and 34 to engage the bifurcated ends of the terminals 27 and 28; and the switch is opened by manipulating the levers 33 and 34 effectively to move the switch connection out of contact with said terminals. The lever 34 is controlled by the lever 33 through the medium of the connecting spring 41, and is given a snapping action by the projections 42 and 43. The spring 41 which is carried by the levers 33 and 34 is effective to hold the switch open when it is open, and also to hold the switch closed when it is closed. This is due to the resistance against the movement of the levers 33 and 34 caused by the camming of the projections 42 and 43 on levers pivoted and operating upon different pivots. For instance, in Fig. 6 the levers are in one of their two adjustments, the connection 45 is out of contact with the switch terminals, and the switch is open. When the levers are thus adjusted to retain the switch open, a part of the projection 42 is between the projection 43 and the pivot supporting the lever 33, so that movement of the lever 33 in the direction of the arrow, shown in Fig. 6, will cause a camming action of the projection 42 against the projection 43, preventing simultaneous movement of the lever 34 and stretching the spring 41. When the projection 42 rises or passes beyond the projection 43 the spring 41 snaps the lever 34 in a direction to follow the lever 33, and snaps the terminal connection 45 into contact with the terminals 27 and 28 thereby closing the circuit. Since the projection 43 is closer to the pivot of its supporting lever 34 than is the projection 42 to the pivot of its supporting lever 33, said projection 43, when the switch is closed, is partially between the projection 42 and the pivot of the lever 33. Therefore, reverse movement of the lever 33 will cause a camming action of the projection 42 against the outer side of the projection 43, and this camming action will prevent the lever 34 from following the lever 33 until the projection 42 is passed beyond the projection 43 and has stretched the spring 41. After the projection 42 passes beyond the projection 43 the spring 41 snaps the lever 34 in a direction following the lever 33, and moves the switch connection 45 out of contact with the terminals 27 and 28.

A rod 47 is operative through the end of the case 30 and has its inner end pivoted to one arm of the bell crank lever 33, so that by manipulation of said rod the switch can be opened and closed. The outer end of the rod 47 extends into a tubular rod 48, and an expansion spring 49 (Fig. 4) is incased within said rods and constitutes a yielding cushion between them. The movement of the rod 48 is limited by a screw 50 mounted in the rod 47 and extending into a slot in the rod 48. The rod 48 is connected to one arm of a bell crank lever 51 pivoted upon a support 52. The opposite arm of the bell crank lever 51 is connected to one arm of a bell crank lever 54 by a link 55, and the opposite arm of said lever 54 is connected to an actuator plate 56, so that by movement of said actuator plate the switch can be opened and closed. The actuator plate is longitudinally movable upon supports 57. A strong spring 58 connects the actuator plate 56 with one of said supports 57 and actuates said plate in a direction to close the switch by bringing the switch connection 45 into contact with the switch terminals 27 and 28. Movement of the actuator plate in the opposite direction and in opposition to the retractile power of the spring 58, to the medium of the connections from the said actuator plate to the lever 33, will actuate said lever 33 and the other parts controlled thereby effectively to move the terminal connection 45 out of contact with the switch terminals 27 and 28, and thereby open the switch.

Provision is made for automatically operating the actuator plate 56 after a predetermined interval during which the adding machine remains unoperated, so that in event of neglect or failure of the operator to turn off the power when leaving the machine the motor itself will actuate the controlling connections effectively to open the switch and turn off the power.

As previously explained the shaft 24 (Figs. 4 and 5) is constantly rotating when the motor is running, and is driven by the power of the motor. A cam 59 (Figs. 4 and 5), is rigid upon the shaft 24 and rotates with said shaft. A support 60 is longitudinally movable upon a part of the support 25 and is provided with a slot which receives a stud 61, guiding and retaining said support 60 in proper position above the actuator plate 56. The support 60 has two arms 62 which extend on opposite sides of the cam 59, so that rotation of said cam reciprocates the support 60 longitudinally. A pawl 63 is pivoted to the support 60 and rides upon the upper edge of the actuator 56 in engagement with the teeth 64 thereon, so that reciprocation of said support 60 operates the actuator plate and the connections controlled thereby effectively to open the switch. A detent pawl 65 is pivoted above the actuator 56 and engages with the teeth 64 effectively to hold the actuator plate 56 in the position to which it is moved by the pawl 63, thereby permitting operation of the pawl 63 effectively to move the actuator plate 56 step by step or tooth by tooth, as required, to open the switch. The pawl 63 is actuated by a spring 66 connecting the tail of the pawl with a lever 67 pivotally supported midway of its ends and having one end pivoted to the pawl 63 and the opposite end connected to a link 68. The tail of the pawl 65 has pin-in-slot connections 69 with the link 67, so that downward movement of the link 67 will disengage the pawl 63 and the pawl 65 from the teeth 64 on the actuator plate and permit said actuator to be moved under control of the spring 58 to close the switch and turn on the power. A spring 70 connects the pin of the pin-in-slot connection 69 with the link 68 effectively to actuate the pawl 65 into engagement with the teeth on the actuator plate 56. The connection between the lever 67 and the link 68 is also of the pin-in-slot type as indicated at 71 so that there may be proper relative movement of the parts as a result of the reciprocation of the support 60. The upper end of the link 68 is connected to a link 72 whose forward end is pivoted to a lever 73. The lever 73 is attached to a rock shaft 74 (Fig. 1), and said rock shaft has an arm 75 above which is the lower end of a key stem 76. The key stem 76 consists of two relatively movable parts yieldingly united by a spring 77, one of the parts being adapted to engage with the arm 75 and actuate said arm and the connections therefrom effectively to release the pawls 63 and 65 from the actuator 56, so as to enable the switch to be opened by the action of the spring 58. One of the parts 76 projects through the key-board of the adding machine and is provided with a finger key 78 for manipulative purposes to attain the results described.

The lever 63 may be operated and the shaft 1 may be rocked in opposition to the tension of the springs 2 by suitable connections controlled by the shaft 11 which is operated whenever the blade 13 is engaged by the wheel 12, as hereinbefore described and as more fully set forth in my co-pending application Number 702,113 heretofore mentioned. As described in said application the actuating connections comprise a cam disk 79, operating to engage a lever 80, with a roller 81, carried by the lever 3. These parts constitute no part of the present invention other than in the general manner described, and, therefore, do not require specific description herein, since specific description would only be duplicating the description of my said former application.

From the foregoing it will be understood that my invention includes mechanism driven positively by the motor for turning off the power after a desired interval of time has lapsed in which the adding machine is not thrown into operation. As fully described in my co-pending application, but which need not be described here since the same constitutes no part of the present invention, the link 18 is controlled and operated by the key 78. As usual depression of the key 78 operates the link 18 to release the arm 16 permitting the blade 13 to engage the rotating wheel 12 and thereby rotate the cam disk 79 effectively to actuate the lever 80 and thereby operate the lever 3 and rock the shaft 1 in opposition to the springs 2. These connections and devices are now well known in the market, and are described in my copending application, and do not constitute any part of the present invention, and, therefore, do not require specific or prolonged description herein. Thus, prior to any rocking operation of the shaft 1 the key 78 must be depressed, and for each depression of said key 78 the lever 80 will be operated and the shaft 1 will be rocked, all of which is well understood.

In connection with these known devices which constitute the subject matter of my former application previously mentioned, my present invention is arranged to coöperate. As hereinbefore explained the connections operated by the key 78 when said key is depressed, effect a release of the pawl 63 and the pawl 65 from the actuator 56 whereupon the spring 58 immediately retracts and operates the connections to the lever 33 effectively to restore said connections and said lever to the position shown in Fig. 5, in which the switch is closed. The timing of the operation of the actuator 60 may be regulated as desired so that the power will be cut off after a desired lapse of time, say after two or three or four minutes. Since the cam 59 is in constant rotation when the power is on and is constantly moving the pawl support 60 in one direction or the other, it is necessary to make provision so that the switch will not be prematurely opened. This requirement is met by the provision of the camming projections 42 and 43, so that the lever 34 is not moved either to open or close the switch until after the lever 33 has been moved nearly the limit of its movement.

I do not restrict myself to specific features but what I claim and desire to secure by Letters Patent is:

1. The combination with an element to be actuated, a motor for actuating said element, means controlling the operation of said element by said motor, a circuit for supplying power to said motor, a switch in said circuit and a lever for operating said switch to open and close the circuit, of gearing permanently entrained with and maintained in constant movement by the running of the motor, and connections between said gearing and said lever whereby said gearing will operate said lever to open the switch after said controlling-means remains idle a definite period of time.

2. In a machine of the character described, the combination with a motor for operating the machine, a shaft maintained in constant rotation by the running of the motor, a pinion on said shaft, and a switch for turning the power off and on, of gearing permanently entrained with said pinion and maintained in constant operation by the running of the motor, a device driven by said gearing for operating said switch to turn off the power, and means for preventing said gearing from operating said switch to turn off the power.

3. In a machine of the character described, the combination with an actuating motor, a switch controlling the admission of power to said motor, a shaft maintained in constant rotation by the running of the motor, a pinion rigid on said shaft and also maintained in constant rotation by the running of the motor, a speed-reducing gearing permanently entrained with said pinion and maintained in constant operation thereby when the motor is running, of an actuator for said switch, elements driven by said constantly operating gearing for moving said actuator and thereby said switch to turn off the power, and a device for disengaging said elements from said actuator to prevent the turning off of the power, substantially as described.

4. In a machine of the character described, the combination with a motor for operating the machine proper, a switch controlling the admission of power to said motor and arranged to be opened and closed to turn the power off and on, of an actuator for said switch, a device for moving said actuator in one direction to open the switch, mechanism driven by the motor for maintaining said device in constant movement when the motor is running effectively to open said switch after a suitable interval of time, means controlling the operation of the machine proper by said motor, and means operated by said controlling-means to prevent opening of said switch, as aforesaid.

5. In a machine of the character described, the combination with a lever, a motor arranged to operate said lever and a switch controlling the admission of power to said motor and arranged to be opened and closed to turn the power off and on, of an actuator for said switch, a shaft maintained in constant rotation by the running of the motor, a pinion attached to said shaft, speed-reducing gearing permanently entrained with said pinion and maintained in constant movement thereby when the motor is running, a reciprocating device maintained in constant movement by said gearing when the motor is running, a pawl on said reciprocating device for moving said actuator to open the switch, a pawl for holding said actuator in whatever position it may be, means for disengaging said pawls from said actuator, and means for restoring the actuator to position in which the switch is closed.

6. In a machine of the character described, the combination with an actuating motor and a switch controlling the admission of power to said motor and arranged to be opened and closed to turn the power off and on, of a rod for actuating said switch to turn the power off and on, an actuator for operating said rod, a yielding connection between said rod and said actuator enabling said actuator to move independently of said rod, and means driven by the motor for operating said actuator and said yielding connection a distance sufficient to move said rod to open the switch.

7. In a machine of the character described, the combination with a motor and a switch for controlling the admission of power to said motor and arranged to be opened and closed to turn the power off and on, of an actuator for said switch, gearing driven by the motor to move said actuator in a direction to open the switch, and yielding elements between said actuator and said switch enabling said actuator to move a desired distance before opening the switch.

8. In a machine of the character described, the combination with an actuating motor and a switch controlling the admission of power to said motor, of an actuator for said switch, a yielding connection between said actuator and said switch enabling said actuator to move a desired distance in a direction to open the switch before actuating said switch, a device for operating said actuator, and means driven by the motor for maintaining said device in constant motion when the motor is running.

9. In a machine of the character described, the combination with an actuating motor and a switch controlling the admission of power to said motor and arranged to be opened and closed to turn the power off and on, of an actuator for said switch, yielding connections from said actuator to said switch enabling said actuator to move a desired distance before opening said switch, automatic means for operating said actuator in one direction to turn on the power, and gearing maintained in constant operation by the running of the motor for operating said actuator in the opposite direction to turn off the power.

10. In a machine of the character described, the combination with a motor and a switch arranged to be opened and closed to turn the power off and on, of a reciprocating actuator for opening and closing said switch, a yielding connection between said actuator and said switch enabling said actuator to be moved in one direction a desired distance before opening said switch, and a train of gearing maintained in constant operation by the running of the motor for operating said actuator and thereby said switch to turn off the power after a desired period of time.

11. Mechanism of the character described comprising a motor, a circuit for supplying power to said motor, a switch in said circuit, an actuator for operating said switch to open and to close the same, a yielding connection between said actuator and said switch enabling said actuator to move a desired distance before opening the switch, gearing constantly driven by the motor when the motor is running, and connection driven by one member of the constantly moving gearing for moving said actuator to open said switch.

12. In a machine of the character described, the combination with a motor for operating the machine, and a switch for turning the power off and on, of a spring actuated device for operating said switch to turn on the power, a yielding connection between said device and said switch, a cam for moving said device to turn off the power, a pinion for operating said cam, and means for driving said pinion from said motor.

13. In a machine of the character described, the combination with an actuating motor, and a switch controlling the admission of power to said motor, of an actuator for said switch, a yielding connection between said actuator and said switch enabling said actuator to be moved a desired distance in one direction before moving said switch, a spring for moving said actuator in one direction, an element for moving said actuator in the opposite direction in opposition to the power of said spring, a device for actuating said element, and gearing driven constantly by the motor when the motor is running for moving said device.

14. In a machine of the character described, the combination with a motor for operating the machine proper, and a switch controlling the admission of power to said motor and arranged to be opened and closed to turn the power off and on, of an actuator for said switch, a yielding connection enabling said actuator to move a desired distance in a direction to open the switch before opening said switch, a spring arranged to move said actuator in one direction to close said switch, manual means determining when said spring shall operate, gearing driven constantly by the motor when the motor is running, and a device constantly operated by said gearing for moving said actuator to open said switch.

15. In a machine of the character described, the combination with a lever, a motor arranged to operate said lever, and a switch controlling the admission of power to said motor and arranged to be opened and closed to turn the power off and on, of an actuator for said switch, a yielding connection enabling said actuator to move a desired distance in a direction to open the switch before opening said switch, and a spring for moving said actuator in one direction to close the switch and turn on the power, gearing driven by the motor, a cam operated by said gearing, a support reciprocated by said cam, a pawl carried by said support for moving said actuator in opposition to said spring to open the switch and turn off the power, and means for preventing said pawl from moving said actuator sufficiently to turn off the power.

16. In a machine of the character described, the combination with an actuating motor, and a switch controlling the admission of power to said motor and arranged to be opened and closed to turn the power off and on, of an actuator, connections from said actuator to said switch, a yielding connection enabling said actuator to move a desired distance in a direction to open the switch before opening said switch, a device for operating said actuator in one direction to turn on the power, manipulative means determining when said device shall operate, an element driven constantly by the running of the motor effectively to cause said actuator to turn off the power after a definite time, and devices under control of said manipulative means for preventing the turning off of the power.

17. In a machine of the character described, the combination with a motor, and a switch arranged to be opened and closed to turn the power off and on, of a reciprocating actuator connected to said switch, a yielding connection enabling said actuator to move a desired distance in a direction to open the switch before opening said switch, a spring acting to move said actuator in one direction, gearing driven constantly by the running of the motor, a pawl driven constantly by the operation of said gearing during the running of the motor, a spring for holding said pawl in contact with said actuator, whereby said pawl will move said actuator and ultimately turn off the power, and connections for moving said pawl out of contact with said actuator to prevent the turning off of the power, substantially as described.

18. The combination with a motor, a switch controlling the admission of power to said motor, a single actuator operable to open and close said switch, a yielding connection enabling said actuator to move a desired distance in a direction to open the switch before opening said switch, automatic means for moving said actuator in one direction to close the switch and turn on the power, a pawl for moving said actuator in the opposite direction to open said switch, a support maintained in constant operation by the running of the motor for operating said pawl, and means for preventing the pawl from turning off the power, said means being operated as an incident to certain operations of said motor.

19. In a machine of the character described, the combination with a motor, a switch controlling the admission of power to said motor, a latch device for holding said switch open or closed, a spring actuated rod for moving said switch to open or closed position, a pawl driven by said motor, a support on which said pawl is carried, a cam for operating said support, and gearing for driving said cam.

20. In a machine of the character described, the combination with a motor, and a switch controlling the admission of power to said motor, of a constantly moving device driven by the motor, and a yielding connection operated by said device for operating said switch to turn off the power after an interval of time.

21. The combination with a motor, a switch controlling the admission of power to said motor and arranged to be opened and closed to turn the power off and on, means driven by the motor for opening said switch to turn off the power after a desired period of time, and detaining devices for preventing said switch from being opened during the initial movement of said motor driven means and prior to the lapse of the desired period of time.

22. The combination with a motor and a switch controlling the admission of power to said motor and arranged to be opened and closed to turn the power off and on, of a train of gearing maintained in constant movement by the running of the motor, an element driven by said train of gearing for opening said switch after a desired period of time, and detaining devices preventing opening of the switch prior to the lapse of the desired period of time.

23. In an adding machine and in combination with the machine proper, a motor, manipulative motor controlling means controlling the starting of the motor, normally inoperative connections between the motor and the machine proper for driving the latter, means controlled by the manipulative motor controlling means for rendering the connection operative to effect an operation of the machine, mechanism constantly driven by the motor during the operation of the latter for controlling the operation of the motor, connections controlled by said mechanism for controlling the operation of the motor whereby the latter is stopped after a predetermined period has elapsed since an operation of said manipulative means.

24. In a device of the class described, the combination of the machine proper, a motor for driving an element thereof, manipulative means for controlling the starting of the motor and the operation of said element by the motor, mechanism continuously and positively driven by the motor, and connections whereby said mechanism operates a part of said manipulative means to shut off power from the motor after a predetermined period has expired since the operation of the manipulative means has ceased.

25. In a device of the class described, the combination of the machine proper, a motor for driving an element thereof, manipulative means intermittently operable, mechanism continuously and positively driven by the motor, devices whereby said mechanism causes power to be shut off from the motor after a predetermined period since the operation of the manipulative means has ceased, and two connections controlled by said manipulative means, one of which on the first operation of the manipulative means controls the starting of the motor and on each subsequent operation of the manipulative means while the motor is running prevents said devices from shutting off the power from the motor, and the other of which connections on each operation of the manipulative means after the first one causes the motor to operate an element of the machine proper.

26. In a machine of the class described in combination with the machine proper, a motor for driving an element thereof, a clutch between the motor and said element, manipulative means for controlling the clutch, mechanism continuously and positively driven by the motor, devices whereby said mechanism causes power to be shut off from the motor after a predetermined period since the operation of the manipulative means has ceased, and two connections controlled by said manipulative means, one of which on the first operation of the manipulative means controls the starting of the motor and on each subsequent operation of the manipulative means while the motor is running prevents said devices from shutting off the power from the motor, and the other of which connections on each operation of the manipulative means after the first one causes the motor to operate an element of the machine proper.

27. In a machine of the class described, a motor for driving one of the elements thereof, a clutch intermediate the motor and said element, mechanism continuously driven by the motor, connections controlled thereby and controlling the supply of power to the motor, and manipulative means controlling the starting of the motor, the same being connected to the clutch for throwing the same into and out of engagement and to said connections to prevent their operation to shut off the power.

28. In an adding machine and in combination with the machine proper, a motor, motor controlling means, mechanism constantly driven by the motor during operation of the latter, connections driven by said mechanism for actuating the motor controlling means for stopping the motor after a definite period has elapsed since an operation of the manipulative means, and manipulative means in the adding machine, and two connections controlled by said manipulative means, one of which on the first operation of the manipulative means controls the starting of the motor and on each subsequent operation of the manipulative means while the motor is running prevents said devices from shutting off the power from the motor, and the other of which connections on each operation of the manipulative means after the first one causes the motor to operate an element of the machine proper.

In witness whereof, I have signed this specification in the presence of two subscribing witnesses.

HARRY LANDSIEDEL.

Witnesses:
HARRY C. YAEGER,
BIRNEY DYSART.